Figure 1A:
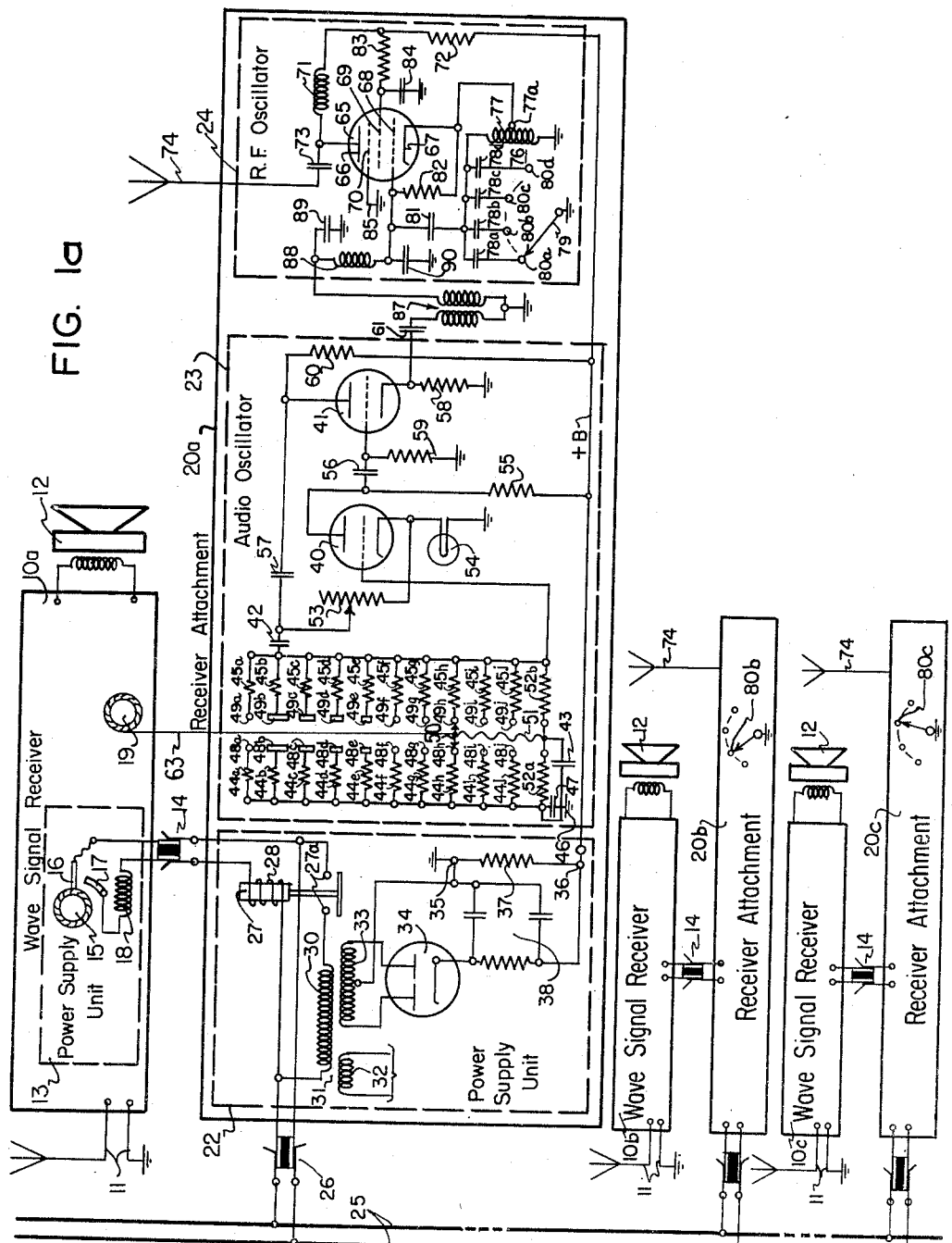

Oct. 11, 1949.   H. A. RAHMEL ET AL   2,484,733
SYSTEM AND APPARATUS FOR RECORDING THE LISTENING
HABITS OF WAVE SIGNAL RECEIVER USERS
Filed Feb. 11, 1948   3 Sheets-Sheet 1

INVENTORS
Henry A. Rahmel
Harry T. Bentley II
BY Mason & Wyss
Attys.

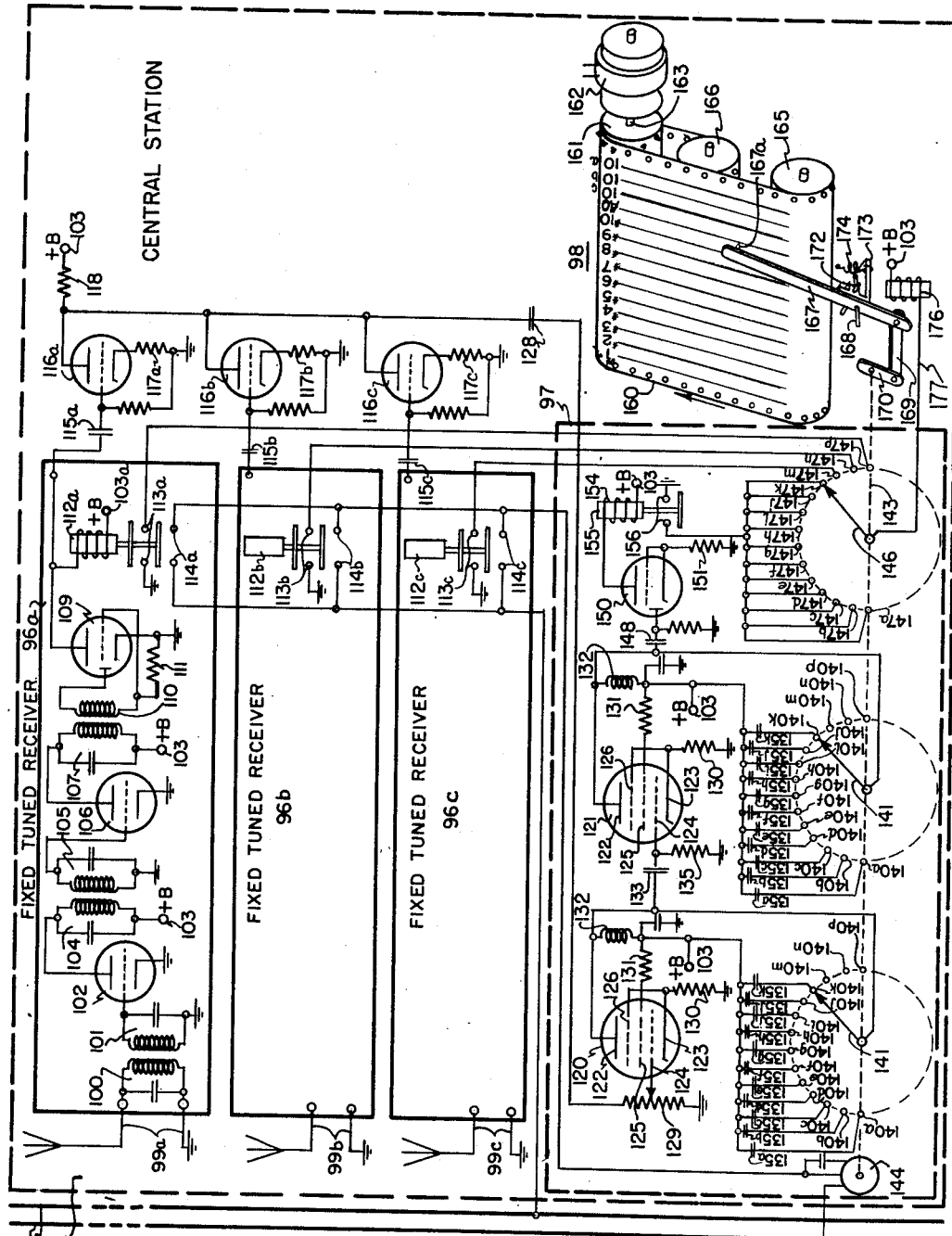

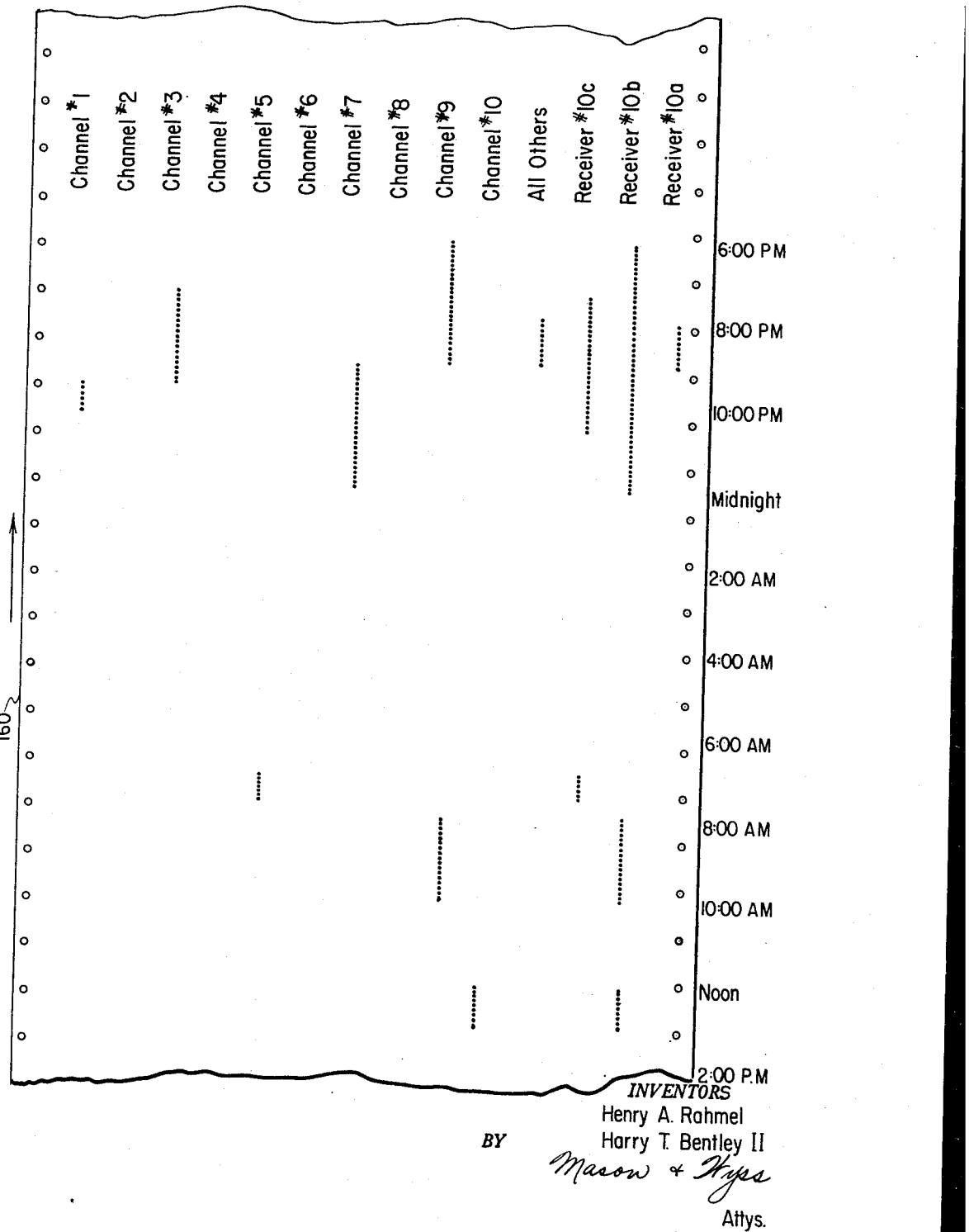

Patented Oct. 11, 1949

2,484,733

UNITED STATES PATENT OFFICE 2,484,733

SYSTEM AND APPARATUS FOR RECORDING THE LISTENING HABITS OF WAVE SIGNAL RECEIVER USERS

Henry A. Rahmel and Harry T. Bentley, II, Evanston, Ill., assignors to A. C. Nielsen Company, Chicago, Ill., a corporation of Illinois Application February 11, 1948, Serial No. 7,647

12 Claims. (Cl. 346—37)

The present invention relates to apparatus for determining the listening habits of wave signal receiver users. More particularly the present invention is concerned with apparatus for making a record with respect to time of the tuning condition of wave signal receivers located in predetermined homes which includes making such a record for all the receivers disposed in the particular homes under consideration even though such homes are multi-receiver homes and also if desired producing records at a central point with respect to the receivers in a plurality of homes.

In recent years numerous arrangements have been suggested for recording the listening habits of wave signal receiver users, whereby with instrumented methods a continuous record of the transmitting stations to which a wave signal receiver is tuned may be made, and from which it is readily possible to analyze the listening habits of such users and prepare reliable information with respect to such listening habits.

It will be understood that in such instrumental methods for determining the listening habits of wave signal receiver users, the receivers in a large number of homes are metered or monitored to afford the basic information from which the analysis can be made. From this basic information a statistical analysis of the various factors affecting the sales effectiveness of particular radio programs may be arrived at. In such a system employing apparatus for recording the listening habits of wave signal receiver users it is contemplated that the selection of the system collaborator homes, that is, the homes in which radio receiver use is to be logged—shall be on the basis such that all of the various factors affecting any process of sampling public opnion, such, for example, as the number of potential listeners, religion, economic affluence, etc., are accounted for on a weighted basis.

Instrumented methods for determining the listening habits of home radio receiver users generally involve the use of a recording device operating in conjunction with each collaborator receiver used in the sampling system to record the extent of use of the receiver and to record as a function of time the wave signal transmitter to which the receiver is tuned for program reception. The usual device of this character embodies facilities for driving a movable recording element such as a movable paper tape, magnetic tape or wire or other recording tape or medium in a predetermined manner together with translating means for variably positioning suitable recording means such as a stylus or the like relative to the recording element in accordance with changes of the tuning of the wave signal receiver. If the recording element moves at a constant speed or in some determinable relationship with respect to time, the record on the recording element not only provides information as to the particular transmitting station or stations to which the receiver is tuned, but also gives accurate information with reference to the time such receiver is tuned to such various transmitting stations.

In general two different types of instrument have been used to produce a record of the extent of receiver use and the particular transmitters to which the receiver is tuned for program reception during a predetermined calendar period. The first or all mechanical type of device employs a mechanical connection between the control means for operating the resonant frequency varying device (which control means might be the tuning shaft of the ganged condensers of a receiver), and the recording stylus of the recorder. The recording stylus is moved transversely of the recording element in accordance with the angular setting imparted to the condenser tuning shaft whereby a record of the particular tuning condition of the receiver is obtained. If the tape is driven at a constant speed then a record of the tuning condition with respect to time is obtained. The connection between the recording means such as the stylus and the receiver tuning shaft dictates the positioning of the recorder in the receiver cabinet which bars its use in connection with small receivers having limited unoccupied cabinet space.

The second type of such instrument used heretofore might be termed an electro-mechanical device, in that an electro-mechanical translating system is interposed between the high frequency signal channel of the receiver and the station recording stylus, to control the movement of the stylus in its operation to record on a time basis the particular transmitters from which programs are received. Generally such a device requires a connection with the local oscillator of receivers of the superheterodyne type and is not adaptable for use with receivers other than the superheterodyne type. Furthermore this type of device generally requires accurate frequency measuring apparatus to be located at the receiver. Such apparatus generally is bulky in the first place and in the second place is usually quite delicate and consequently should not be subjected to jars or the like which it might receive through movement, for example, of the wave signal receiver when re-arranging the furniture in a particular room where the receiver is located.

It would be desirable to provide apparatus for producing a record of the extent of receiver use which is applicable to any type of receiver whether of the superheterodyne type or not. It would furthermore be desirable that any apparatus which must be installed at the receiver be simple and compact so as to be applicable to substantially all receivers regardless of size. The recording and translating equipment for producing a record of the tuning condition of the receiver should be capable of being located remotely from the receiver such for example as in the basement or the closet of a home without the requirement of special electrical or mechanical connections between the receiver and such recording apparatus. In many cases it may be desirable to have the recording equipment located at a central office to record information from a plurality of homes which can be accomplished by employing suitable links such as telephone wires or space links employing beamed ultra high frequency radio waves. It is furthermore desirable that a single recording and translating unit should be capable of recording the tuning conditions of all the wave signal receivers in a single home (in the event that the recorder is located at a central office a single recording device may be used to record the tuning condition of the receivers in a plurality of homes) while still giving complete information with respect to each receiver.

It will be understood that in any particular locality the number of transmitting stations to which a wave signal receiver is generally tuned is fairly limited. One factor which limits the number of transmitting stations to which a receiver is tuned is of course the relative range of the receiver. Another factor is the relative range of the transmitting station. In addition the advantageous reception obtainable from a finite number of stations over the reception of other stations which might be tuned in but whose transmitting characteristics are not too favorable for good program reception mitigates against tuning the receiver to more than a limited number of transmitters. Furthermore, with the present networks whereby the identical programs are carried by numerous stations it is rare indeed when a receiver is tuned to other than a limited number of transmitting stations. It would be desirable therefore to provide a simplified arrangement which will provide for recording in a manner which can readily be decoded the tuning condition of a wave signal receiver to a plurality of predetermined stations which would include all those stations to which the receiver is likely to be tuned together with additional information which would indicate the time that a receiver is tuned to stations other than the finite number of stations to which the receiver is normally tuned. It will be understood that if the wave signal receiver is tuned to stations other than the finite number for a substantial period of time that some of such other stations should be included within the finite number.

In apparatus commonly employed heretofore the transverse position of a trace or record on a recording element such as a tape was indicative of the tuning condition of the receiver. It will be understood that due to the apparent variable band widths of transmitting frequencies as viewed on the wave signal receiver dial scale, that certain stations can be tuned in over a considerable area of the tuning scale whereas others are confined to a very narrow area. This has complicated matters from the standpoint of decoding such records or tapes and it would be desirable to provide an arrangement in which the traces on the tape appear in narrowly confined channels equally spaced from one another thereby greatly to facilitate the decoding operation.

Accordingly it is an object of the present invention to provide a new and improved apparatus for recording the listening habits of wave signal receiver users.

It is a further object of the present invention to at least in part obviate the above mentioned disadvantages of prior art systems and apparatus for recording the tuning condition of one or more wave signal receivers.

It is another object of the present invention to provide improved apparatus of the character described for recording information with respect to the tuning conditions of a plurality of wave signal receivers with a relatively small amount of apparatus the bulk of which is located at a point remote from the receivers while the apparatus located at the receivers is of such small size as to be capable of being disposed within the available cabinet space of substantially all types of receivers.

It is another object of the present invention to provide a new and improved apparatus of the character referred to above having all of the advantages enumerated above.

Still another object of the present invention is to provide an apparatus employing a single record receiving or recording element for recording information with respect to the tuning condition of a plurality of remotely located wave signal receivers with the information recorded in the form of traces disposed in uniformly spaced channels so as to be readily decoded.

A still further object of the present invention is to provide new and improved apparatus wherein only a simple mechanical connection is made with the receiver and which may be employed whether the receiver is tuned with a conventional tuning knob or through the actuation of push buttons.

Further objects and advantages of the present invention will become apparent as the following description proceeds and the features of novelty which characterize the invention will be pointed out with particularity in the claims annexed to and forming a part of this specification.

For a better understanding of the present invention reference may be had to the accompanying drawings in which:

Figs. 1a and 1b are diagrammatic illustrations showing first and second portions of a system and apparatus employing the present invention arranged so as to be united into a single disclosure; and Fig. 2 is a view of a typical record obtained with the apparatus of the present invention with the transverse dimension thereof somewhat enlarged.

It will be understood that the present invention is equally applicable to homes employing only a single wave signal receiver or to homes having a plurality of receivers. It will furthermore be understood that the sample of homes from which the statistical analysis is to be obtained is determined without knowledge of the number of receivers disposed therein. Consequently it is essential for the apparatus to be equally capable of monitoring all of the receivers within a particular home whether it be one or more, or in many cases be capable of monitoring the receivers in a plurality of homes by recording the tuning conditions at a central office or the like. By way of example there is illustrated in Figs. 1a and 1b of the drawings three wave signal receivers designated generally by the reference numeral 10 characterized by a suitable subscript to distinguish between the receivers. As illustrated in Fig. 1a there are provided wave signal receivers 10a, 10b and 10c respectively. All of these receivers are indicated diagrammatically although the receiver 10a is shown in slightly more detail. It will be understood that these wave signal receivers may be identical but more than likely they will be quite different with one of the receivers probably being a console model while the others might be small table models or even a portable radio. Each of the receivers is indicated as comprising an antenna ground circuit 11 and signal reproducer or loud speaker 12. As was mentioned above although these receivers are likely to be of the superheterodyne type it is not essential as far as the present invention is concerned that they be of this type. By way of example it is assumed that all of these receivers are located in a single home and connected to the house wiring circuit 25 which is illustrated with dashed line portions to indicate that the receivers 10a, 10b and 10c are located remotely from each other. However, the present invention is equally applicable to arrangements where the receivers are located in different homes and the recorder at a central office, the only different consideration being the links, space or otherwise, interconnecting the portions of the system since in the latter case no common house wiring circuit is available. However, a space link or telephone lines could be employed in such a situation.

Referring now to wave signal receiver 10a which is representative of the receivers 10b and 10c it is illustrated as including a power supply unit generally indicated at 13 which is connected by means of a plug connector 14 with a suitable source of power. The power supply unit 13 includes the conventional on-off switch which preferably is combined with the manual volume control means in the conventional manner. As illustrated the control knob 15 controls the on-off switch comprising the contacts 16 and 17 which are connected in series with a suitable winding 18, which may comprise a primary winding of a suitable transformer. The receiver 10a is also illustrated as comprising a conventional tuning knob 19 which is mounted on a suitable tuning shaft for controlling the position of the resonant frequency varying means such as the ganged condensers if condenser tuning is employed or the position of the iron cores if permeability tuning is employed. It will be understood that the tuning shaft might be positioned by push buttons or push buttons might be employed to control the tuning conditions of the wave signal receiver without in any way affecting the position of a rotatable tuning shaft. As will become apparent from the following description the present invention is readily applicable to push button operated receivers whether they control the position of the tuning shaft or not.

If the wave signal receiver employs a tuning shaft which is positioned at various positions whenever the receiver is tuned to transmitting stations whose signal is receivable by said receiver, it will be apparent that the position of the tuning shaft will be indicative of the tuning condition of the reeciver. Experience has shown that with a very high percentage of receivers a mechanical link can be connected to the dial drum. For the purpose of simplifying the disclosure, the present invention has been specifically illustrated in that connection.

Since, as has been pointed out above, the recording and translating equipment which is fairly sensitive and somewhat bulky apparatus is located at a point remote from the receivers such as 10a it is necessary to provide at each receiver apparatus which is capable of transmitting to a remote point information pertinent to the tuning condition of the associated receiver. In accordance with the present invention this apparatus is very small and compact so that it may be disposed in the available cabinet space of most receivers. As illustrated each wave signal receiver such as 10a, 10b, and 10c has associated therewith an apparatus provided in accordance with the present invention which may be referred to as a receiver attachment. These receiver attachments are designated by the reference numerals 20a, 20b and 20c for the receivers 10a, 10b and 10c, respectively. The receiver attachment 20a is shown in detail in Fig. 1a of the drawings and essentially comprises three units as follows: a power supply unit 22, an audio oscillator 23, and an oscillator 24 which may be a radio frequency oscillator when the receivers are all located in a single home, but which might also comprise an ultra high frequency oscillator where the receivers in different homes are monitored and a record produced at a central office. The power supply unit 22 is preferably connected to a source of alternating current such as the house wiring circuit generally designated by the reference numeral 25 through a suitable plug connector 26. In order that the receiver attachment 20a is energized only when the receiver 10a is turned on (and similarly for the receiver attachments 20b and 20c) there is provided in the power supply unit 22 a relay 27 having its winding 28 connected in series with the combined volume control and on-off switch 15, 16 and 17 of the wave signal receiver 10a. Consequently whenever the wave signal receiver 10a is turned on the flow of current to the receiver through the plug connectors 26 and 14 causes relay 27 to be energized to close its normally open contacts 27a. It will be apparent that with the arrangement described the receiver attachment 20a may be applied to the receiver 10a as far as the electrical circuit thereof is concerned merely by removing one portion of the plug connector 14 from the conventional power circuit and instead applying the corresponding portion of the plug connector 26 of the power supply unit 22 to the power circuit and connecting the plug connector 14 as shown in Fig. 1a of the drawing.

The contacts 27a of the relay 27 are illustrated as controlling the energization of the primary winding 30 of a transformer 31 including secondary windings 32 and 33 respectively. The secondary winding 32 preferably supplies the filament voltage for the electron discharge valves employed in the receiver attachment 20a. The secondary winding 33 on the other hand is connected to the anodes of a twin diode 34 connected in the circuit of a full wave rectifier so as to provide at the terminals 35 and 36 between which there is provided a resistor 37, a direct current potential suitably filtered as by means of a filtering unit 38.

For the purpose of providing a signal uniquely representative of the tuning condition of the wave signal receiver associated therewith such as the wave signal receiver 10a there is provided an audio oscillator 23 which may be any suitable form of audio oscillator but which has been specifically illustrated as an RC oscillator of the Wien bridge type. As illustrated the audio oscillator 23 is very similar to that disclosed in the August 1946 issue of Radio News, pages 38 to 40, entitled "Audio oscillators," by J. C. Hoadley. The RC or Wien bridge oscillator 23 operates directly at audio frequencies. As illustrated it comprises a two-stage audio amplifier including triodes 40 and 41 respectively and a resistance-capacitance bridge generally referred to as an RC bridge, which is at the same time regenerative and degenerative. The RC bridge comprises the capacitors 42 and 43 which are preferably identical in rating and two sets of resistors generally designated by the reference numerals 44 and 45, one resistor from each set being adapted to be selectively rendered effective at any one time. The set of resistors 44 which are in a sense arranged in parallel, but only one of which is effective at any one time, are specifically designated as 44a, 44b, 44c, 44d, 44e, 44f, 44g, 44h, 44i and 44j. Similarly the resistors 45 are designated as 45a, 45b, 45c, 45d, 45e, 45f, 45g, 45h, 45i and 45j respectively. The resistors marker with the same subscript preferably have identical values of resistance but the resistors having different subscripts differ from each other and as schematically illustrated have increasing values of resistance as the subscripts change from a to j. One terminal of each of the resistors 44a to 44j inclusive is connected to a common terminal and to one terminal of the capacitor 43. As illustrated this terminal is grounded as indicated at 46 through a suitable capacitor 47. The other ends of the resistors 44a to 44j are respectively connected to spaced contact members 48a, 48b, 48c, 48d, 48e, 48f, 48g, 48h, 48i and 48j. Similarly the resistors 45a to 45j inclusive have a common terminal which is connected to one terminal of the capacitor 42. The other terminals of the resistors 45 are connected to spaced contact members 49a, 49b, 49c, 49d, 49e, 49f, 49g, 49h, 49i and 49j which are disposed in linear relationship opposite the corresponding contact members 48a, 48b, 48c, 48d, 48e, 48f, 48g, 48h, 48i and 48j so as to be engageable by a suitable sliding switch contact 50, the contacts with similar subscripts being simultaneously engaged. The sliding contact 50 is furthermore adapted to be connected by a flexible conductor 51 to the other terminal of the capacitor 43. The other terminal of the capacitor 42 is connected through a suitable adjustable resistor 53 with the cathode of the triode 40. The resistor 53 is preferably a feed back resistor which is adjustable so that the feed back may be adjusted to an optimum value. The flexible terminal 51 is also connected to the control electrode of the triode 40.

In order that an audio frequency is producible by the audio oscillator 23 when the sliding switch contact 50 is not in engagement with any of the associated contacts 44 and 45 there are provided a pair of resistors 52a and 52b which are connected in parallel with the particular resistors 44 and 45 rendered effective by the sliding switch contact 50. These resistors are preferably relatively large to insure an audio frequency output of 40 cycles, for example, if no other pair of resistors 44 and 45 are connected into the RC circuit.

For the purpose of improving the stability of the audio oscillator 23 there is preferably provided in the cathode circuit of the triode 40 a resistor 54 in the form of a low wattage lamp whose resistance varies with temperature. When the triode 40 attempts to draw more current the temperature of the lamp 54 increases, thereby effectively increasing the bias on the triode 40 and increasing the degenerative effect. Consequently the resistor or lamp 54 tends automatically to hold the output of the oscillator constant and the distortion to a low value. The anode of the triode 40 is preferably connected to the terminal 36 of the power supply unit 22 which effectively is a source of +B potential through a voltage dropping resistor 55. This voltage dropping resistor 55 is preferably proportioned so that the average current flowing through the lamp or resistor 54 falls on the knee of the lamp's temperature resistance characteristic whereby the desired stabilizing effect occurs. The plate circuit of the triode 40 is connected by a suitable coupling condenser 56 to the control electrode of the triode 41. The anode of the triode 41 is connected by a coupling capacitor 57 with the RC bridge and specifically with the terminal of the condenser 42 connected to the adjustable resistor 53. The cathode of the triode 41 is grounded as indicated through a resistor 58. A suitable grid leak for the triode 41 is provided by means of the resistor 59. The coupling capacitor 56 should be large if it is desired to maintain oscillation at low frequencies. Similarly coupling capacitor 57 must be very large as it works into a very low resistance composed of the resistors 53 and 54 connected in series. Preferably the capacitor 57 is an electrolytic condenser and works satisfactorily in view of the fact that the direct current polarizing voltage is higher than the alternating current voltage it must handle. The anode of the triode 41 is connected to the source of +B potential or in other words to the terminal 36 of the power supply unit 22 through a suitable voltage dropping resistor 60. The output of the audio frequency oscillator is illustrated as being obtained from the cathode circuit of the triode 51 and is supplied through a coupling capacitor 61.

It will be understood that the output frequency of the audio oscillator 23 may be controlled by varying the capacitance of the capacitors 42 and 43 or the resistance of the resistors 44 and 45 or both. When the capacitors 42 and 43 are equal and the particular resistors 44 and 45 which are rendered effective by the movable switch arm 50 are equal, and the resistors 52a and 52b are equal, then the frequency of the output of the audio oscillator may be given by the following expression:

$$f = \frac{1}{2\pi RC}$$

where R is the value in ohms of the parallel resistance circuit comprising the resistor 52a, and the particular resistor 44 which is rendered effective as for example the resistors 44h for the position indicated in Fig. 1a of the drawings, and C is the capacitance in farads. If none of the resistors 44 and 45 are rendered effective for a particular setting it will be apparent that R will comprise the resistance of the resistor 52a. For the purposes of the present invention the resistors 44j and 45j preferably have a value such that the output frequency of the audio oscillator is approximately 1000 cycles and the resistance of the other resistors are decreased in value so that the frequency steps of the output of the audio oscillator 23 differ from each other by about one and one half kilocycles with the highest frequency being produced when the resistors 44a and 45a are rendered effective. When only the resistors 52a and 52b are effective a low frequency of the order of 40 cycles or the like appears at the output of the audio oscillator which is indicative of tuning the wave signal receiver 10a to a station for which no channel is provided in the receiver attachment 20a or in other words to what may be termed tuning to "all other stations."

For the purpose of controlling the output frequency of the audio oscillator 23 in dependence upon the tuning condition of the associated wave signal receiver 10 the slidable contact switch 50 which engages with the contacts 48 and 49 is connected by suitable means, such as a Bowden wire or the like generally indicated by the reference numeral 63, with the manual tuning knob 19 or the tuning shaft so that if the tuning condition of the wave signal receiver 10 is changed the resistances in the RC bridge of the Wien bridge oscillator 23 are selectively changed and consequently the output frequencies of the audio oscillator are varied. Although the contacts 48 and the contacts 49 are schematically illustrated in fixed positions, it will be understood that these contacts are adjustably spaced so that any desired channels may be chosen within the limits of the number provided for by the contacts 48 and 49.

It should be understood that in the event that the wave signal reeciver 10a is provided with push buttons suitable means may be provided to insure the connection of the proper resistances 44 and 45 in the RC bridge of the audio oscillator 23 in dependence upon the particular push button which is actuated. Although ten frequency steps are illustrated for the audio oscillator 23 exclusive of the "all other" stations frequency condition, it will be apparent that a larger or smaller number may be employed depending upon the number of stations to which the wave signal receiver 10 is normally tuned. It will furthermore be understood that the various frequency steps of the audio output of the oscillator 23 may be representative of channels in the AM, FM, or television bands or a combination thereof so that the tuning condition of the wave signal receiver, regardless of the band to which it is tuned, will be indicated by a predetermined audio frequency output of the audio oscillator 23.

It will be understood by those skilled in the art that although in the standard broadcast band each station is assigned a band width at 10 kc., the extreme limits of movement of the tuning shaft while remaining tuned to the same station, vary considerably for different stations. It is of course essential that regardless of the position of the tuning shaft, for example, of the receiver when tuned to a station which may be received over a considerable angular movement in the case of a rotary tuning shaft or linear movement in the case of longitudinally movable tuning means, that the same audio output at the oscillator 23 be provided. This is represented schematically in Fig. 1a of the drawings by variable widths for the contacts 48 and 49. Where the tuning shaft of the receiver may be moved over quite an angle while remaining tuned to the same station wide contacts 48 and 49 are provided for the associated channels in the audio oscillator 23. In other words the switch comprising the spaced linearly arranged contacts 48 and 49 and the sliding contact 50 are designed to insure the proper audio frequency output for all positions of the tuning shaft of the receiver 10a that the particular channels provided for in the receiver attachment 20a can be received. Such an arrangement is broadly claimed in a copending Rahmel application Serial No. 7,648, filed February 11, 1948, and assigned to the same assignee as the present invention. It should be understood that the switch comprising the sliding contact 50 and the stationary contacts 48 and 49 is only schematically shown. A suitable switch for this purpose is disclosed and claimed in a copending application of Fred Krahulec, Serial No. 78,926, filed March 1, 1949, and assigned to the same assignee as the present application.

With the arrangement described thus far the different tuning conditions of the wave signal receivers 10a, 10b and 10c are represented by different predetermined audio frequencies each different audio frequency being indicative of a different tuning condition of the associated wave signal receiver. In order that a record may be produced at a remote point of the particular output frequency of the audio osciators associated with each receiver so as to identify the receiver as well as the tuning condition thereof, each receiver attachment is also provided with an oscillator 24 which is capable of producing a signal uniquely representative of the particular receiver. This oscillator may be an ultra high frequency oscillator or where the receivers being monitored are in a single home, a radio frequency oscillator capable of producing a radio frequency. The oscillator 24 is referred to hereinafter as a radio frequency oscillator but it should be understood that this is by way of example only and it might equally well comprise an ultra high frequency oscillator where this is desirable. As illustrated the radio frequency oscillator 24 which is preferably identical for each receiver attachment comprises an electron coupled oscillator including the pentode 65 having an anode 66, a cathode 67, a control electrode 68, a screen grid 69 and a suppressor grid 70. The anode 66 of the pentode 65 is connected to the source of +B potential, which is the terminal 36 of the power supply unit 22, through a radio frequency choke coil 71 and a voltage dropping resistor 72. This plate circuit of the pentode 65 is also connected by means of a coupling capacitor 73 with a suitable antenna 74 if the signal from the receiver attachment 20a is transmitted by space link to a suitable recorder unit. It should be understood however that the output of the plate circuit of the radio frequency oscillator 24 might be connected by some other link such as for example the power circuit 25 or other suitable means to the remote point where the recorder to be described hereinafter is located. Preferably when the recorder is located in the multi-receiver home the space link or the power circuit comprising the conductors 25 are employed since these schemes eliminate the requirement of any additional conductors connected between the receiver attachment and the remote recording point. Where the recorder is located at a central office an ultra high frequency space link may be employed, or if desired, telephone wires.

For the purpose of producing a radio frequency signal the radio frequency oscillator 24 comprises a tank circuit 76 including the inductance 77 and a plurality of capacitors 78a, 78b, 78c and 78d respectively adapted to be selectively connected in parallel with the inductance 77 by means of an adjustable switch 79. In other words the capacitors 78 are arranged in parallel with one common terminal of all of the capacitors connected to one terminal of the inductance 77 and the other terminals of the capacitors 78a, 78b, 78c and 78d being connected to respective contacts 80a, 80b, 80c and 80d arranged so as to be engaged by movable switch arm 79. Preferably the value of the capacitors 78 is such that the frequency output of the radio frequency oscillator 24 may be adjusted to either two, three, four or five megacycles depending upon which of the contacts 80a, 80b, 80c or 80d is engaged by the switch arm 79. One terminal of the tank circuit 76 is connected by means of a capacitor 81 with the control electrode 68 of the pentode 65. The cathode 67 is connected to a suitable tap 77a on the inductance 77 and a grid leak resistor 82 is connected across the triode to cathode circuit of the pentode 65. The screen grid 69 is connected to the source of +B potential through a suitable voltage dropping resistor 83. A by-pass condenser 84 to ground is also connected to the screen grid 69. The suppressor grid 70 is grounded as indicated at 85. Any suitable means for modulating the radio frequency output of the RF oscillator 24 with the audio frequency output of the audio oscillator 23 may be provided. As illustrated a suitable coupling transformer 87 is interposed between the coupling capacitor 61 and the control electrode 68 of the pentode 65. A suitable radio frequency choke coil 88 prevents the radio frequency from affecting the audio oscillations. The radio frequency by pass condensers 89 and 90 are provided to ground both ends of the choke coil 88 for radio frequencies.

From the above description it will be apparent that the oscillator 24 produces a carrier signal which is modulated with the audio frequency output of the audio oscillator 23. By employing a radio frequency within the frequency range of 1.8 to 5 megacycles, operation in a band which will cause a minimum of difficulty from the standpoint of the F. C. C. regulations is provided. The output of the radio frequency oscillator 24 would be initially adjusted with respect to signal strength, radiation, and the like to conform with F. C. C. regulations. It will be noted that the adjustable switch 79 for the receiver attachments 20a, 20b and 20c is set at different positions whereby it is readily possible to determine from the frequency of the transmitted radio frequency signal which receiver is responsible. In other words means are provided for producing a modulated radio frequency signal indicative not only of the tuning condition of the receiver but also uniquely representative of a particular receiver. If an ultra high frequency oscillator is provided the signal may be beamed in the desired direction and in this frequency range no difficulty with the F. C. C. regulations should be encountered.

For the purpose of producing a record of the frequency output of the audio oscillators 23 associated with each of the receiver attachments 20a, 20b, and 20c with respect to time, so as effectively to produce a record of the tuning condition of the wave signal receivers 10a, 10b, and 10c at all times, there is provided a recording unit and associated equipment generally indicated by the reference numeral 95 and designated as the central station. The term "central station" is employed since the recording equipment for a plurality of receivers such as 10a, 10b, 10c and the like is located at a central point preferably remote from the receivers at a suitable inconspicuous place in the home such for example as the basement, a closet, the attic or the like, or even at a central office remote from the home whereby the receivers in a plurality of homes may be monitored. Whereas the equipment in the receiver attachments is very compact, particularly when midget tubes are employed as well as dual tubes wherever this is possible (the tubes 40 and 41 are preferably midget triodes combined in a single envelope such for example as the 6J6), the equipment at the central station need not be confined in a small space and furtherfore may comprise equipment which is delicate and which should not be subjected to jars and the like due to moving the equipment around.

Essentially the central station 95 comprises a plurality of fixed tuned radio frequency amplifier-detector units preferably referred to as fixed tuned receivers, one for each of the wave signal receivers being monitored or metered. Since three wave signal receivers 10a, 10b and 10c have been described the central station 95 is provided with three fixed tuned receivers 96a, 96b and 96c respectively which are identical except for the frequency to which these receivers are tuned. It will be understood that the fixed tuned receiver 96a will be tuned to receive only the frequency of the radio frequency oscillator 24 in the receiver attachment 20a while the fixed tuned receivers 96b and 96c will be tuned respectively to receive only the radio frequency outputs of the oscillators 24 associated with the receiver attachments 20b and 20c which by virtue of the adjustment of the switch arm 79 are set at different frequency valves. In addition to the fixed tuned receivers 96a, 96b and 96c, the central station 95 further includes a step-tuned audio frequency amplifier and translating unit generally designated by the reference numeral 97 and a recording unit generally indicated at 98.

Since the fixed tuned receivers 96a, 96b and 96c are all identical only the fixed tuned receiver 96a will be described in detail and the corresponding parts of the other receivers when illustrated will be designated by the same reference numerals marked with the same subscript as that associated with the reference numeral 96 for the particular receiver. As illustrated the fixed tuned receiver 96a comprises an input circuit specifically illustrated as an antenna ground circuit 99a. It will be understood that if the antennas 74 of the receiver attachments 20a, 20b and 20c are dispensed with and instead of a space link the output of the radio frequency oscillators 24 is impressed directly on the house wiring circuit 25, then the antenna-ground circuits 99a, 99b and 99c would also be dispensed with and instead the input circuits for the fixed tuned receivers 96a, 96b and 96c would be connected directly to the house wiring circuit 25. The antena-ground circuit 99a for the fixed tuned receiver 96a is connected to a tuned circuit 100 which in turn is coupled to a tuned circuit 101 connected to the input of an electron discharge valve 102 in the form of a triode acting as a radio frequency amplifier. The plate circuit of the triode 102 is connected to a source of +B potential indicated at 103 through a tuned circuit 104. The tuned circuit 104 is furthermore coupled to a tuned circuit 105 connected in the input circuit of a triode 106 which also functions as a radio frequency amplifier and whose plate circuit is connected to a source of +B potential also designated by the reference numeral 103 through the tuned circuit 107. It will be understood that the tuned circuits 100, 101, 104, 105 and 107 are fixed tuned circuits tuned to the frequency of the radio frequency oscillator 24 in the particular receiver attachment with which the fixed tuned receiver is associated. For the fixed tuned receiver 96a these tuned circuits are tuned to the frequency of the RF oscillator 24 of the receiver attachment 20a, which as was pointed out above might be a frequency of two megacycles. The tuned circuits in the fixed tuned receivers 96b and 96c would preferably be tuned to a frequency of three and four megacycles respectively, or some other suitable values in the 1.8 to 5 megacycle frequency range.

The fixed tuned receiver 96a further includes an electron discharge valve 109 in the form of a diode-triode, the diode section functioning as a detector and being coupled to the tuned circuit 107 by means of an inductance 110. The detector section of the electron discharge valve 109 will cause the modulation components of the modulated radio frequency output of the oscillator 24 of the receiver attachment 20a to appear across the resistor 111 connected in series with the plate to cathode circuit thereof. The control electrode of the triode section of the electron discharge valve 109 is connected to one terminal of the resistor 111 so as to apply a negative bias thereto when modulation components are detected by the diode section of the valve 109. The plate circuit of the triode section of the valve 109 is connected to the source of +B potential again designated by the reference numeral 103 through the winding of a suitable control relay designated by the reference numeral 112a. It will be apparent therefore that a current continually flows through the winding of the relay 112a and the plate circuit of the triode section of the valve 109 as long as no substantial negative bias due to detection of the modulation components of the modulated carrier signal appears across the resistor 111. The relay 112a is therefore normally energized and is so indicated in Fig. 1b of the drawings. Only upon the receipt of a carrier having a frequency which the fixed tuned receiver 96a is capable of receiving does a voltage appear across the resistor 111 which causes a sufficient decrease in the current flowing in the plate circuit of the triode section of the valve 109 to cause the relay 112a to be deenergized to close its two sets of normally open contacts 113a and 114a.

The detected audio voltage appearing at the plate circuit of the triode section of the electron discharge valve 109 is connected through a suitable coupling capacitor 115a to the input of an audio frequency amplifier comprising the electron discharge valve 116a, whose control electrode is connected to one terminal of the coupling capacitor 115a. The cathode of the electron discharge valve 116a is grounded through a suitable resistor 117a and the anode is connected to a source of +B potential designated by the reference numeral 103 through a suitable voltage dropping resistor 118.

The fixed tuned receivers 96b and 96c are identical with the fixed tuned receiver 96a and similarly include relays 112b and 112c respectively and audio frequency amplifiers comprising electron discharge valves 116b and 116c respectively. As illustrated the plate circuits for all of the audio frequency amplifiers comprising the electron discharge valves 116a, 116b and 116c are connected in parallel to the source of +B potential 103 through the single voltage dropping resistor 118.

From the above description it will be apparent that when the wave signal receivers 10a, 10b and 10c are turned off no radio frequency signal from the oscillators 24 in the respective receiver attachments is received at the central station 95 and consequently the relays 112a, 112b and 112c remain energized to maintain open (as illustrated in Fig. 1b of the drawings) their normally open contacts 113 and 114, designated with appropriate subscripts. Under these conditions no audio frequency signal is applied to the audio frequency amplifiers comprising the valves 116a, 116b or 116c. Whenever one or more of the wave signal receivers 10a, 10b and 10c is turned on however, an audio frequency output will be produced by one or more of the audio frequency oscillators 23 which frequency will either be indicative of one of the ten channels represented by the variable resistors 44 and 45, or indicative of tuning of the associated receiver to what is termed "all other stations." Consequently the turning on of any receiver 10a, 10b or 10c will cause its associated receiver attachment to produce a modulated radio frequency signal which will render the associated fixed tuned receiver 96 effective to deenergize its associated relay 112 with the result that the associated contacts 113 and 114 are closed. Also the demodulated audio frequency signal will appear in the parallel connected plate circuits of the electron discharge valves 116.

For the purpose of producing a record indicative of the tuning condition of the wave signal receivers 10a, 10b or 10c or any others which might be provided the step-tuned audio frequency amplifier 97 and recorder unit 98 are provided. As illustrated the step-tuned audio frequency amplifier and translating unit 97 comprises a pair of electron discharge valves 120 and 121 arranged in cascade in the form of a two-stage step-tuned amplifier. As illustrated each of the electron discharge valves 120 and 121 is in the form of a pentode comprising anodes 122, cathodes 123, control electrodes 124, screen grids 125 and suppressor grids 126. The control electrode 124 of the electron discharge valve 120 is connected to the output of the parallel arranged audio frequency amplifiers 116a, 116b and 116c through a suitable coupling capacitor 128 and a potentiometer 129 in the form of a resistor having one terminal grounded and the other terminal connected to the coupling capacitor 128. A variable tap on the potentiometer 129 permits appropriate adjustment of the magnitude of the audio frequency voltage applied to the control electrode 124 of the electron discharge valve 120 comprising the first stage of the two-stage step tuned amplifier. The suppressor grid 126 of each pentode 120 and 121 is connected to its associated cathode 123 which in turn is grounded through a suitable resistor 130. The screen grids 125 of each of the electron discharge valves 120 and 121 are connected to the source of +B potential 103 through their respective voltage dropping resistors 131. +B potential from the source 103 is supplied to each plate 122 through suitable respective inductances 132. The plate circuit of the pentode 122 is also coupled to the control electrode 124 of the pentode 121 through a suitable coupling capacitor 133. The control electrode 124 is provided with a suitable grid leak resistor 135.

For the purpose of providing tuned circuits for each of the stages of the audio frequency amplifiers comprising the electron discharge valves 120 and 121 the inductances 132 of each stage are adapted to be parallel by respective suitable capacitors designated for each stage by the reference numerals 135a, 135b, 135c, 135d, 135e, 135f, 135g, 135h, 135i, 135j and 135k. All of these capacitors for each stage have a common terminal which is connected to one terminal of the associated inductance 132. The other terminals of the capacitors 135a to 135k inclusive are connected to a plurality of contacts arranged in equally spaced relationship about a portion of the circumference of a circle. These contacts are designated by the reference numerals 140a, 140b, 140c, 140d, 140e, 140f, 140g, 140h, 140i, 140j, and 140k, which together with the contacts 140m, 140n and 140p are arranged in equally spaced relationship in the form of a semicircle as is clearly indicated in Fig. 1b of the drawings. A rotary switch arm 141 is adapted to successively engage the contacts 140a to 140p inclusive in that order during a half cycle of rotation. The values of the capacitors 135a to 135j are chosen so as to provide with the associated inductance 132 a plurality of tuned circuits, each corresponding to a different one of the audio frequencies produced by virtue of the resistances 44a to 44j and 45a to 45j respectively, and the step-tuned audio frequency amplifier units comprising the discharge valves 120 and 121 will successively pass audio frequency signals capable of being produced by the audio oscillators 23 as the appropriate capacitors 135 are rendered effective by the rotary switch arms 141. In other words, during each cycle of rotation, which preferably is once per minute all of the frequencies capable of being produced by the audio oscillators 23 are capable of being passed by the step tuned audio frequency amplifier unit 97 at the instant that the appropriate contacts are engaged by the rotating switch arms 141. The switch arms 141 of each of the step-tuned amplifier stages are interconnected by a suitable shaft designated by the reference numeral 143 which is drivingly connected to a synchronous motor unit 144 preferably capable of driving the switch arms 141 at one revolution per minute. The capacitors 135k and associated contacts 140k are provided to permit tuning of the step-tuned amplifier unit 97 to the frequency produced by the audio oscillators 23 when the associated receivers are tuned to "all other stations."

It will be apparent that unless one or more of the wave signal receivers 10 are turned on there is no necessity for the step-tuned amplifiers described above to be effective. Accordingly the synchronous motor 144 is normally deenergized and is only energized when one or more of the wave signal receivers 10 are turned on. Accordingly the contacts 114a, 114b and 114c of the associated relays 112a, 112b and 112c are connected in parallel with each other and the parallel arranged contacts are connected in series with the power supply from the house wiring circuit 25 to the synchronous motor unit 144. When any one of the relays 112a, 112b or 112c is deenergized indicating the receipt of a carrier signal by one or more of the fixed tuned receivers 96, the synchronous motor unit 144 is energized. The synchronous motor unit 144 furthermore drives through the shaft 143 a rotary switch arm 146 substantially identical with the rotary switch arms 141 capable of successively engaging a plurality of spaced contacts 147a, 147b, 147c, 147d, 147e, 147f, 147g, 147h, 147i, 147j, 147k, 147m, 147n, and 147p in an identical manner with the contacts 140 marked with corresponding subscripts. These contacts correspond exactly to the contacts 140 and are arranged along the circumference of a half circle so as to be successively engaged during one half cycle rotation of the switch arm 146.

The contacts 140m, 140n and 140p have no function and are not connected to anything as indicated in the drawings but correspond to the contacts 147m, 147n and 147p which contacts form a part of the apparatus for designating whether one or more of the wave signal receivers 10 are turned on.

The amplified audio frequency at the output of the two-stage step-tuned audio frequency amplifier is coupled by means of a coupling capacitor 148 to the diode section of an electron discharge valve in the form of a diode-triode 150 so as to rectify any audio frequency appearing at the output of the step-tuned audio frequency amplifiers. The cathode of the diode triode electron discharge valve is grounded through a suitable resistor 151, and the control electrode of the triode section is connected to the cathode so as to be supplied with a positive bias when a suitable signal is detected by the diode section thereof. The triode section consequently acts as a direct current amplifier and the plate circuit is connected to a source of direct current +B potential designated by the reference numeral 103 through the winding 154 of a relay 155 having normally open contacts 156. Whenever an audio frequency signal is detected by the diode section of the valve 150, sufficient current flows through the winding 154 of the relay 155 so as to close the contacts 156. The contacts 156 are adapted to connect the contacts 147a to 147k inclusive to ground.

Any suitable recorder may be provided to record the tuning conditions of the wave signal receivers 10a, 10b and 10c. As illustrated, the recorder 98 comprises a movable recording or record receiving element 160, which is illustrated as a tape having sprocket holes adjacent the edges thereof adapted to be engaged by a suitable sprocket 161 which is driven by a synchronous motor 162 continuously connected to a suitable source of potential. The synchronous motor 162 is connected to the sprocket 161 by means of the shaft 163. Preferably the synchronous motor 162 is energized from the house wiring circuit 25 at all times regardless of whether or not other parts of the apparatus at the central station 95 are energized, thereby insuring continuous movement or at least movement in a predetermined manner with respect to time of the record receiving element 160. The recorder 98 also includes the tape supply spool 165 and the take up spool 166 together with suitable means for maintaining the tape in a taut condition.

The means for producing a record or trace on the recording element 160 is illustrated as comprising a stylus 167 which is supported for arcuate movement on a pivot 168 so that the inscribing portion 167a is adapted to move transversely of the tape or record receiving element 160. The stylus 167 is connected by means of a suitable link 169 and a crank 170 with the shaft 143 of the synchronous motor unit 144. It will be apparent that with this arangement the position transversely of the record receiving element 160 of the inscribing portion 167a of the stylus 167 will correspond to the position of the switch arms 141 and 146 with reference to their particular contacts 140 and 147. As far as the contacts 140a to 140k are concerned the position of the stylus 167 will correspond to a particular frequency produced by the audio frequency oscillators 23 described above and consequently to a particular tuning condition of one or more of the wave signal receivers 10a, 10b and 10c.

The inscribing portion 167a is normally not in contact with the record receiving element 160. In order to produce a trace the stylus pivot point 168 is supported on a movable carriage 173 mounted for limited movement about a pivot 172. A suitable spring 174 biases the carriage 173 in such a manner that the inscribing portion 167a is not in trace producing engagement with the record receiving element 160. A portion of the carriage 173 forms the armature of an electromagnet comprising a winding 176. One terminal of the winding 176 is connected to the source 103 of +B potential while the other terminal is connected by the conductor 177 with the switch arm 146. With this arrangement it will be apparent that whenever the contacts 156 are closed and the switch arm 146 is in a position to contact one of the contacts 147a to 147k inclusive the inscribing portion 167a may be caused to engage in a trace producing manner the movable record receiving element 160. It will be apparent that with this arrangement the record receiving element 160 will be channelized into equally spaced channels as indicated by the fine parallel lines numbered 1 to 10 corresponding to the ten stations to which the wave signal receivers 10a, 10b and 10c are likely to be tuned. The 11th channel marked AO in Fig. 1b of the drawings is representative of the "all other stations" channel.

In order to produce an indication of which wave signal receivers are turned on, a plurality of three additional channels are provided designated as 10a, 10b and 10c respectively which correspond to the contacts 147m, 147n and 147p. The contact 147m is connected to ground through the contacts 113c of the relay 112c. Similarly the contact 147n is connected to ground through the contacts 113b of the relay 112b, and also the contact 147p is connected to ground through the contacts 113a of the relay 112a. Whenever one or more of the relays 112a, 112b or 112c are energized one or more of the contacts 147m, 147n and 147p are grounded to indicate that one or more of the wave signal receivers 10a, 10b or 10c are turned on. When the stylus 167 is in the position corresponding to the channels 10a, 10b or 10c a trace will be produced depending upon whether or not the associated contacts engageable by the switch arm 146 are grounded through the contacts 113 or one or more of the relays 112. It will be noted that since the contacts 140 and 147 are arranged in a semicircle the stylus 167 can produce a trace while moving in only one direction across the record receiving element 160 and for the reverse direction of movement no trace will be produced since the switch arms 141 and 146 engage no contacts for this half cycle of rotation.

In Fig. 2 of the drawings there is illustrated an enlarged portion of the record receiving element 160 to illustrate a typical record which might be produced thereon. Since the record receiving element 160 preferably moves in some predetermined manner with respect to time such as at a constant speed, for example, time is indicated along the longitudinal dimension of the element 160. Almost a full twenty-four hour record is illustrated. The traces will of course appear as a series of closely spaced dots (one produced each minute) since the inscribing portion 167a periodically engages the record receiving element 160 and immediately moves away therefrom when the winding 176 is deenergized. Referring now to Fig. 2 of the drawings it is noted that at 6:00 p. m. the receiver 10b was turned on and remained on continuously until midnight. This receiver was also turned on at 8:00 a. m. for two hours and again at noon for one hour. The receiver 10a was turned on for one hour from 8:00 p. m. to 9:00 p. m., while the receiver 10c was turned on from 7:30 p. m. to 10:30 p. m. and from 7:00 a. m. to 7:30 a. m. It is readily observed that the receiver 10b from 6:00 p. m. to 9:00 p. m. was tuned to the station corresponding to channel No. 9 while from 9:00 p. m. to midnight this receiver was tuned to the station corresponding to channel No. 7. From 8:00 a. m. to 10:00 a. m. the receiver 10b was tuned to the station corresponding to channel No. 9, while from noon to 1:00 p. m. the receiver 10b was tuned to channel No. 10. From 8:00 p. m. to 9:00 p. m. the receiver 10a was tuned to some station not provided for by the ten channels illustrated and this is indicated by the trace in the channel indicative of "all other stations" and designated as "all others" or "AO." From 7:30 p. m. to 10:00 p. m. the receiver 10c was tuned to the station corresponding to channel #3, while from 10:00 to 10:30 p. m. receiver 10c was tuned to the station corresponding to channel No. 1. From 7:00 a. m. to 7:30 a. m. the receiver 10c was tuned to channel #5.

With this arrangement it is apparent that readily decodable information is obtained. Since the indications of the tuning conditions of the receivers appears on the record receiving element 160 in equally spaced channels, the decoding process is greatly simplified. Only when receivers are simultaneously turned on or turned off will there be any ambiguity as to the interpretation of the record and the rare occurrence of this insures obtaining a readily decodable record at substantially all times.

In view of the detailed description which has been included above the operation of the apparatus of the present invention will be apparent to those skilled in the art. A signal will be produced at each receiver indicative of the tuning condition of the receiver which is transmitted as the modulation component of a suitable carrier. The choice of the carrier frequency immediately acts as a means to identify the particular receiver involved and the audio frequency modulation components are indicative of the station to which the receiver is tuned. By means of a simple apparatus in the form of a step-tuned audio frequency amplifier and translating unit a clear and unambiguous record of the tuning condition of one or more wave signal receivers is readily produced with the information contained in equally spaced channels on the record receiving element. It will be apparent that a much larger number of channels than the number illustrated by way of example may be employed which may be indicative of one or more of amplitude modulation, frequency modulation and television signals. Furthermore a recording element in the form of a magnetic tape or other suitable means might equally well be employed.

It will be apparent to those skilled in the art that the present invention is not limited to the particular constructions and arrangements shown and described but that changes and modifications may be made without departing from the spirit and scope of the invention, and it is aimed in the appended claims to cover all such changes and modifications.

What is desired to be secured by Letters Patent of the United States is:

1. Apparatus for indicating at a remote point the tuning condition of one or more wave signal receivers, comprising, means associated with a particular one of said one or more receivers and responsive to the tuning of the associated receiver for developing a plurality of distinct audio frequency signals each signal representative of a different channel to which said receiver may be tuned when in use, a radio frequency oscillator having an output signal of a predetermined frequency uniquely representative of said particular receiver, means for modulating said radio frequency signal with said audio frequency signal to produce an audio frequency modulated radio frequency signal, a signal transmission link for transmitting said modulated radio frequency signal from said receiver to a remote point, means at said remote point controlled over said link by said modulated radio frequency signal for detecting and converting said audio frequency signals to indications of the channels to which said particular receiver is tuned, and means at said remote point for converting said radio frequency signal to an indication uniquely identifying said particular one of said one or more receivers.

2. Apparatus for indicating at a common remote point the tuning condition of a plurality of wave signal receivers, comprising, separate means associated with each receiver and responsive to the tuning of the associated receiver for developing a plurality of distinct audio frequency signals each signal representing a particular channel to which said associated receiver may be tuned when in use, a separate radio frequency oscillator associated with each receiver having an output signal of a predetermined frequency uniquely representative of its associated receiver, means for modulating said radio frequency signal from said oscillator with said audio frequency signal from the associated means, to produce a modulated radio frequency signal for each receiver in use, a signal transmission link for transmitting the modulated radio frequency signals from said plurality of receivers to a common remote point, means at said remote point controlled over said link by said modulated radio frequency signals for detecting and converting said audio frequency signals to indications of the channels to which the plurality of receivers are tuned, and means at said remote point for converting said radio frequency signals to indications uniquely identifying each different one of said receivers which are in use whereby indications are obtained of the tuning condition of each of a plurality of different receivers.

3. Apparatus for indicating at a remote point the tuning condition of a wave signal receiver, comprising, means associated with said receiver and responsive to the tuning thereof for developing a plurality of distinct audio frequency signals each signal representative of a different channel to which said receiver may be tuned when in use, a radio frequency oscillator having an output signal of a predetermined frequency uniquely representative of said receiver, means for modulating said radio frequency signal with said audio frequency signal to produce an audio frequency modulated radio frequency signal, means for selectively varying the audio frequency signals produced in dependence upon varying the tuning of said receiver, a signal transmission link for transmitting said modulated radio frequency signal from said receiver to a remote point, means at said remote point controlled over said link by said modulated radio frequency signal for detecting and converting said audio frequency signals to indications of the channels to which the receiver is tuned, and means at said remote point for converting said radio frequency signal to an indication uniquely identifying said receiver.

4. Apparatus for indicating at a remote point the tuning condition of a wave signal receiver, comprising, means associated with said receiver and responsive to the tuning of the associated receiver for developing a plurality of distinct audio frequency signals each signal representative of a different channel to which said receiver may be tuned when in use, a radio frequency oscillator having an output signal of a predetermined frequency uniquely representative of a said receiver, means for modulating said radio frequency signal with said audio frequency signal to produce a modulated radio frequency signal, means included in said first mentioned means for producing a distinctive audio frequency signal when said receiver is tuned to channels for which no distinct audio frequency signal is provided, a signal transmission link for transmitting said modulated radio frequency signal from said receiver to a remote point, and means at said remote point controlled over said link by said modulated radio frequency signal for detecting and converting said audio frequency signals to indications of the channels to which the receiver is tuned.

5. Apparatus for indicating at a remote central recording point the tuning condition of one or more wave signal receivers, comprising, a receiver attachment associated with each receiver including an audio oscillator and a radio frequency oscillator, variable impedance means for causing said audio frequency oscillator to produce a plurality of signals having distinct frequencies, switching means for selectively controlling said variable impedance means in response to the tuning condition of the associated one of said receivers whereby a distinct audio frequency signal is produced for each of a plurality of different tuning conditions of the associated receiver, means for causing said radio frequency oscillator to produce a carrier signal uniquely representative of the associated receiver whenever said associated receiver is turned on, means for modulating said carrier signal with the output of said audio frequency oscillator, a signal transmission link for transmitting said modulated carrier signal from each of said receiver attachments to said remote central recording point, means at said recording point controlled over said link by said modulated carrier signal for detecting and converting said audio frequency signals produced in each receiver attachment to indications of the channels to which the associated receiver is tuned, and means at said remote point for converting said carrier signals produced in each receiver attachment to indications uniquely identifying each of the receivers which are turned on and whose receiver attachments are adapted to transmit a carrier signal to said central recording point.

6. In combination with apparatus for recording the tuning condition of a wave signal receiver, means for producing a signal having a plurality of different characteristics each representative of a particular tuning condition of said receiver, a recording device having associated therewith a longitudinally movable record tape, means comprising a translating device for converting said signal to a plurality of recordable responses one for each different characteristic of said signal, means operated by said responses for making line indications on said tape transversely spaced with respect to the direction of movement thereof, and means for assuring that said line indications are always at substantially the same transverse position on said tape for any particular tuning condition of said receiver and that the possible line indications on said tape are substantially equally spaced.

7. In combination with apparatus for recording the tuning condition of a plurality of wave signal receivers, means for producing a first signal having a plurality of different characteristics each representative of a particular tuning condition of one of said receivers, means for producing a second signal having the same plurality of different characteristics as said first signal and each representative of a particular tuning condition of another of said receivers, a recording device having associated therewith a longitudinally movable record tape, means comprising a stepped tuned amplifier and translating device for converting said first and second signals into a plurality of recordable responses one for each different characteristic of each of said signals, means responsive to said responses for making line indications on said tape transversely spaced with respect to the direction of movement thereof, and means for assuring that said line indications are always at the same transverse position on said tape for any particular tuning condition of any of said plurality of receivers and that the possible line indications on said tape are substantially equally spaced.

8. In combination with apparatus for recording the tuning condition of a wave signal receiver, means for producing a signal having a plurality of different frequency steps each step being representative of a particular tuning condition of said receiver, a recording device having associated therewith a longitudinally movable record tape, means comprising a stepped tuned amplifier and translating device for converting said signal to a plurality of recordable responses one for each different frequency step of said signal, means responsive to said responses for making line indications on said tape transversely spaced with respect to the direction of movement thereof, and means for assuring that said line indications are always at substantially the same transverse position on said tape for any particular tuning condition of said receiver and that the possible line indications on said tape are substantially equally spaced.

9. Apparatus for indicating at a remote central recording point the tuning condition of one or more wave signal receivers, comprising, a receiver attachment associated with each receiver including an audio oscillator and a radio frequency oscillator, variable impedance means for causing said audio frequency oscillator to produce a plurality of signals having distinct frequencies, switching means for selectively controlling said variable impedance means in response to the tuning condition of the associated one of said receivers whereby a signal having a different audio frequency is produced for each of a plurality of different tuning conditions of the associated receiver, means for causing said radio frequency oscillator to produce a carrier signal uniquely representative of the associated receiver whenever said associated receiver is turned on, means for modulating said carrier signal with the output of said audio frequency oscillator, a signal transmission link for transmitting said modulated carrier signal from each of said receiver attachments to said remote central recording point, a plurality of fixed tuned receivers at said recording point each tuned to receive a different one of the unique carrier signals produced in each receiver attachment, means responsive to the receipt of a carrier signal by one of said fixed tuned receivers for producing a record indication that its associated wave signal receiver is turned on, each of said fixed tuned receivers being capable of detecting the audio frequency modulation components of the carrier signal received thereby, means for cyclically and successively providing a path for the distinct frequencies of said audio frequency signal, and means for producing different record indications for each of said frequency steps so as uniquely to identify the particular tuning conditions of said receiver.

10. In a system for indicating at a remote point the tuning condition of a wave signal receiver, the combination of a receiver attachment associated with said receiver including a pair of signal producing devices, variable impedance means for causing one of said devices to produce a plurality of signals having distinct frequencies, switching means for selectively controlling said variable impedance means in response to the tuning condition of said receiver, whereby a signal having a distinct frequency is produced for each of a plurality of different tuning conditions of said receiver, means for causing the other of said devices to produce a signal uniquely representative of said receiver whenever said receiver is turned on, means for combining the signals produced by each of said devices, a signal transmission link for transmitting said combined signal from said receiver attachment to said remote point, means at said remote point controlled over said link by said combined signal for converting said combined signal to an indication of the channel to which said receiver is tuned at any instant as well as an indication that the receiver is turned on.

11. Apparatus for indicating at a remote recording point the tuning condition of a wave signal receiver, comprising a receiver attachment associated with said receiver including a first oscillator and a second oscillator, said first oscillator comprising an RC bridge type oscillator having a plurality of selectable resistors for selectively producing oscillations having a plurality of distinct frequencies, switching means for selectively rendering a different one of said resistors effective, means for relating said switching means to said receiver to cause the selection of different ones of said resistors for different tuning conditions of said receiver whereby a signal having a different frequency is produced for each of a plurality of different tuning conditions of said receiver, means for causing said second oscillator to produce a carrier signal of a predetermined frequency whenever said receiver is turned on, means for modulating said carrier signal with the output of said first oscillator, a signal transmission link for transmitting the modulated signal from said receiver attachment to said remote recording point, a fixed tuned receiver at said recording point tuned to receive only a signal of said predetermined frequency, means responsive to the receipt of a signal by said fixed tuned receiver for producing a record indicating whether or not said wave signal receiver is turned on, means in said fixed tuned receiver for detecting the modulation components of said modulated signal which may have different frequencies depending upon the tuning condition of said wave signal receiver, cyclically operated step tuned amplifier means for successively providing a path for the different frequencies which said modulation components may have, and means for producing a different record indication for each frequency passed by said step-tuned means so as to identify the tuning condition of said receiver at any time.

12. In a system for indicating at a remote recording point the tuning condition of a wave signal receiver, the combination of a receiver attachment associated with said receiver including a first oscillator and a second oscillator, said first oscillator comprising an RC bridge type oscillator having a plurality of selectable resistors for selectively producing oscillations having a plurality of distinct frequencies, switching means for selectively rendering a different one of said resistors effective, means interconnecting said switching means and the tuning means of said receiver to cause the selection of a different one of said resistors for different tuning conditions of said receiver whereby a signal having a different frequency is produced for each of a plurality of different tuning conditions of said receiver, means for causing said first oscillator to produce a signal of a distinct frequency when said receiver is tuned to any channel for which no appropriate resistor is provided in said first oscillator, means for causing said second oscillator to produce a carrier signal of a predetermined frequency whenever said receiver is turned on, means for modulating said carrier signal with the output of said first oscillator, a signal transmission link for transmitting the modulated signal from said receiver attachment to said remote recording point, a fixed tuned receiver at said recording point tuned to receive only a signal of said predetermined frequency, means responsive to the receipt of a signal by said fixed tuned receiver for producing a record indicating whether or not said wave signal receiver is turned on, means in said fixed tuned receiver for detecting the modulation components of said modulated signal which may have different frequencies depending upon the tuning condition of said wave signal receiver, cyclically operated step-tuned amplifier and translating means for successively providing a path for the different frequencies which said modulation components may include, and means for producing a different record indication for each frequency passed by said step-tuned means so as uniquely to identify the tuning condition of said receiver at any time.

HENRY A. RAHMEL.
HARRY T. BENTLEY, II.

No references cited.